June 9, 1953  S. D. RUSSELL  2,641,116
SAFETY WHEEL FOR BALERS OR THE LIKE
Filed Feb. 14, 1945
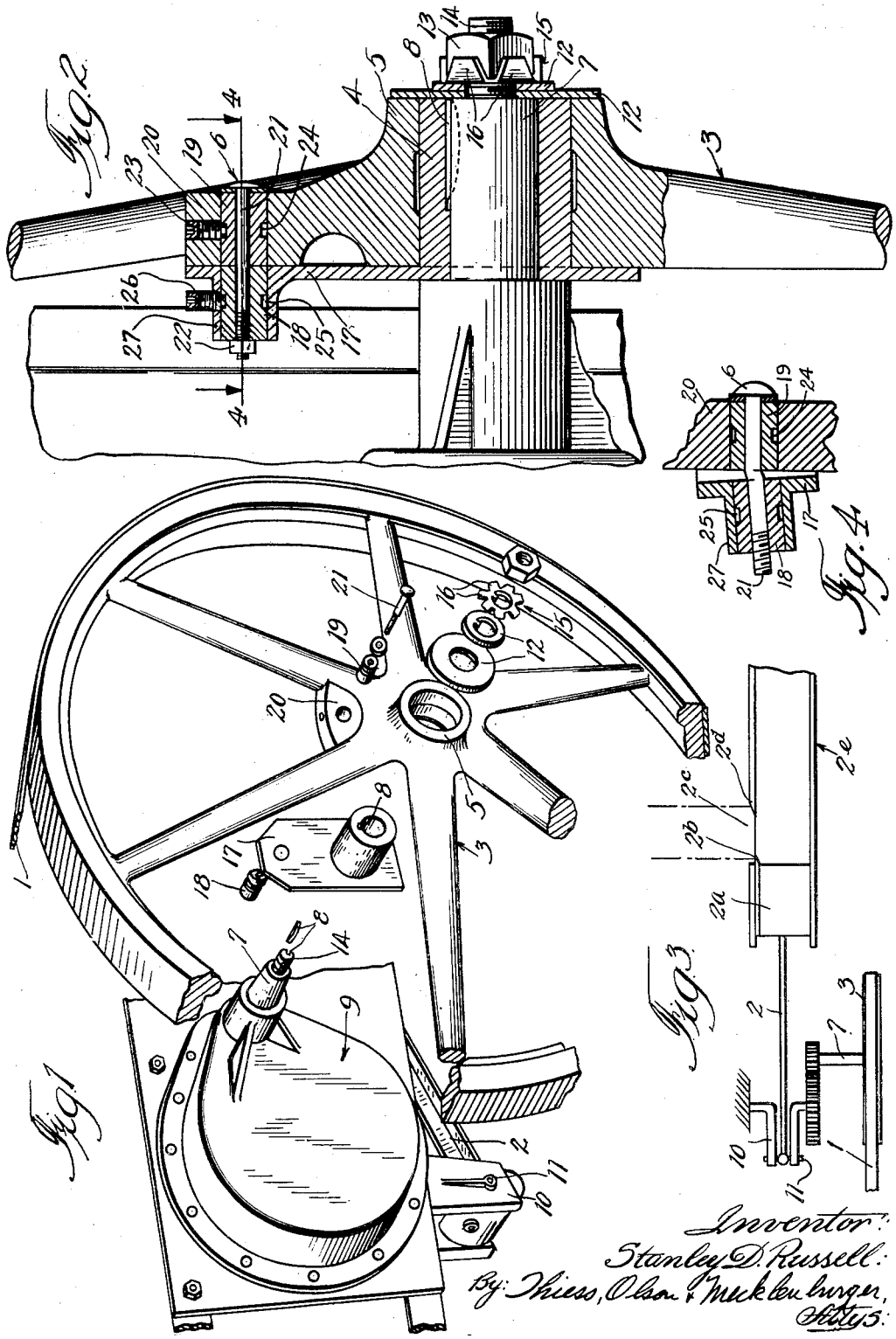
Inventor:
Stanley D. Russell
By Thiess, Olson & Mecklenburger
Attys.

Patented June 9, 1953

2,641,116

UNITED STATES PATENT OFFICE 2,641,116

SAFETY WHEEL FOR BALERS OR THE LIKE

Stanley D. Russell, Racine, Wis., assignor to J. I. Case Company, Racine, Wis., a corporation of Wisconsin Application February 14, 1945, Serial No. 577,882

1 Claim. (Cl. 64—28)

My invention relates to safety flywheels for balers, or the like.

In baling presses, a reciprocating ram packs the material in the baling chute. As the material in the chute becomes compressed, the resistance to the motion of the ram increases. It is usual to provide a flywheel in the transmission line between the motor and the ram, in order to carry the ram through its reciprocating motion in spite of the greatly increased resistance to motion toward the final stroke of the ram. This rather sudden increase in resistance to motion of the ram causes a severe strain in the connection of the flywheel to the transmission, sometimes resulting in shearing of the key or other damage.

In some baling presses, the ram is provided with a shearing blade or knife which co-operates with a relatively fixed shearing blade to cut the material as it is being fed to the baling chute into slices which will enable the bale to be readily separated in layers when the baling wires are removed. In such presses, unless preventive means are provided, the press is liable to be damaged if foreign objects, such as large chunks of wood, rocks, or the metal ends of pitchforks should, by chance, enter the chute and get into the path of the knife, thus causing an obstruction to movement which would cause excessive strain on the transmission to the ram.

One of the objects of my invention is to provide a suitable shear pin connection between the flywheel and the transmission which will free the flywheel for free rotation in the event that the strain becomes dangerously excessive.

Other objects and advantages of the invention will be apparent from the description and claim.

In the drawings, in which an embodiment of my invention is shown,

Figure 1 is an exploded perspective view showing the drive for the baler ram;

Fig. 2 is an axial sectional view showing the connection between the flywheel and the baler transmission, and Fig. 3 is a diagrammatic view of the construction shown in Fig. 1.

Fig. 4 is a sectional view on the line 4—4 of Fig. 1 with parts omitted illustrating a condition common in this art and which is corrected by the invention.

Referring to the drawings in detail, the construction shown comprises a belt 1 driven from the motor (not shown), a reciprocating link or connecting rod 2 connected with the ram 2ª of the baler, reciprocable in the baling chute 2ᵉ, and transmission between the power driven belt and the ram actuating connecting rod. This transmission comprises a flywheel 3 over which the belt 1 runs, a bearing sleeve 4 extending through the hub 5 of the flywheel and connected thereto by a shear pin construction 6, a shaft 7 to which the bearing sleeve 4 is keyed at 8 and any suitable or usual transmission 9 between the shaft 7 and crank arm 10 to which the connecting rod 2 for the baler ram is pivotally connected at 11.

The hub 5 of the flywheel is held on the sleeve by means of collars 12 and a nut 13 threaded on a reduced threaded extension 14 of the power shaft. The nut may be held against unscrewing by means of the usual lock washer 15 keyed to the shaft and having ears 16 bent up and engaging the sides of the nut.

The shearing pin construction between the flywheel and the bearing sleeve comprises a crank arm 17 extending radially from the bearing sleeve 4, a hardened steel bushing 18 set in this radially extending arm, a hardened steel bushing 19 set in the web portion 20 of the flywheel, and a shear pin 21 extending through these hardened steel bushings 18 and 19 and secured in place by means of a nut 22. A set screw 23 may be provided for holding the bushing 19 in place on the flywheel.

As indicated above, in some baling presses, the ram 2ª is provided with a shearing blade 2ᵇ which operates across the passage 2ᶜ, through which material is fed to the baling chute 2ᵉ and co-operates with a fixed shearing blade 2ᵈ for cutting the material, as it is being fed to the baling chute 2ᵉ, into slices which will enable the bale to be readily separated into layers prior to using it for feed. In this construction, it will be seen that the shear pin flywheel transmission described above will prevent excessive strain which might cause breakage of the machinery.

In operation, if the resistance to movement of the ram becomes dangerously excessive, it will result in a greatly increased resistance to the driving action of the shear pin 21, and this resistance to motion, together with the momentum of the flywheel 3 will cause the pin 21 to be sheared by the shearing action of the adjacent edges of the openings in the hardened steel bushings 18 and 19. As is well known there is a tendency in all shearing apparatus for the shearing edges to be forced apart by the material or object being sheared, the blades being necessarily massive in character and well supported or "backed up" if the object to be sheared is at all substantial. In the present instance, the object, of course the shear pin 21, a fairly large bolt, is quite substantial, while the shearing edges by reason of weight restrictions cannot be supported to any substantial extent, the nut 22 serving to prevent such separation of the bushings 18 and 19 until the shearing action is at least partially complete. Fig. 4 illustrates what happens if nut 22 is left off and excessive stress or torque is applied to the flywheel with corresponding resistance in arm 17. The inherent springiness of arm 17 together with the hereinbefore mentioned tendency for the shearing portions to separate, causes a springing apart of the arm and flywheel and a tendency for the pin 21 to bend as shown exaggerated in Fig. 4, thus causing a poor shearing relation between the pin and the bushings and resulting in erratic performance as to the degree of overload at which shearing will take place. The nut 22 and head of bolt or pin 21 press the bushings into definite shearing contact and assure a true shearing action at least until the pin is partially severed so that the degree of overload permitted is accurately determined by the true shearing strength of the pin. When the pin 21 is sheared, the flywheel 3 is free to spin idly on the bearing sleeve 4. When the baler is ready to be put in operation again, it is only necessary to insert a new shear pin.

Returning to a somewhat more detailed description of the shear pin construction, it will be noted that bushing 19 is provided with a groove 24 into which set screw 23 may engage so that the bushing is not likely to be displaced in the event that the set screw should become slightly loosened in any manner.

Bushing 18 is preferably made identical with bushing 19, having a groove 25 engaged by a set screw 26 which is preferably, although not necessarily, identical with set screw 23. Bushing 18 is slidable in a sleeve portion 27 formed integrally or otherwise fixed with above mentioned crank arm 17. Thus in the event of shearing of pin 21, the pin is readily replaced without disturbing any of the other parts. On the other hand, if such shearing should result in damage to either of bushings 18 or 19, it is a simple matter to remove the appropriate set screw and replace the bushing with a new one. In view of the fact that the bushings are identical, it is necessary to provide only one type of spare bushings since any bushing may fit in either web portion 20 or sleeve 27. It will thus be seen that I have provided an unusually practical expedient for accomplishing the objects of the invention and what I claim as new and desire to secure by Letters Patent of the United States is:

In an overload release mechanism for a device having a driven shaft, the combination of a driving element journaled on said shaft, having a central hub portion and providing a substantially cylindrical shearing bushing receiving opening spaced a substantial distance from said central hub portion substantially in the axial plane of the shaft, a driven arm fixed on said shaft adjacent the driving element and having a shearing bushing receiving opening aligned, in one position of said arm and driving element with the first mentioned opening, a shearing bushing in each opening, said bushings having faces disposed in shearing contact with each other and having aligned axial bores, a shear bolt traversing said bores and tying said bushings, and accordingly said arm and driving element in driving and driven relationship, means holding said bushings in said openings, and said bolt having a head in contact with the end of one bushing remote from the other bushing and a nut in contact with the end of the other bushing remote from the first bushing, the pressure of said nut and head against said bushings preventing axial separation of said bushings prior to shearing of said bolt, said holding means and said bolt limiting springing apart of said arm and driving element under overload.

STANLEY D. RUSSELL.

References Cited in the file of this patent
UNITED STATES PATENTS

| Number | Name | Date |
|---|---|---|
| 71,212 | Pierce | Nov. 19, 1867 |
| 1,574,466 | Brown | Feb. 23, 1926 |
| 1,685,098 | Sklovsky | Sept. 25, 1928 |
| 1,740,838 | Roesen | Dec. 24, 1929 |
| 2,307,556 | Wileman | Jan. 5, 1943 |
| 2,384,188 | Mercier | Sept. 4, 1945 |